A. E. BLAKE.
MECHANICAL MOVEMENTS.

No. 182,153.  Patented Sept. 12, 1876.

Witnesses
John Becker.
Fred. Haynes

A. E. Blake
by his Attorneys
Brown & Allen

UNITED STATES PATENT OFFICE.

ARTHUR E. BLAKE, OF MENDOTA, ILLINOIS.

IMPROVEMENT IN MECHANICAL MOVEMENTS.

Specification forming part of Letters Patent No. 182,153, dated September 12, 1876; application filed August 16, 1876.

*To all whom it may concern:*

Be it known that I, ARTHUR E. BLAKE, of Mendota, in the county of La Salle and State of Illinois, have invented a new and useful Improvement in Mechanical Movements; and I do hereby declare that the following is a full, clear, and exact description of the same, reference being had to the accompanying drawing, which forms part of this specification.

This invention is an improvement upon that description of mechanical movements in which a revolving driving pulley or device is made to communicate to a concentrically-arranged shaft rotary motion in one direction only by means or through the intervention of a pawl and ratchet-wheel.

The invention is applicable, among other purposes or uses, to the driving of sewing-machines, to prevent back movement of the sewing mechanism when the driving-band pulleys or wheels are rotated backwardly.

The invention consists in a novel combination of parts, whereby the ratchet-wheel, which is fast on the shaft to which it is required to communicate motion in one direction only, is operated by applying the entire driving force directly to the end of the pawl, in such a manner as to cause a rocking motion of the pawl on its pivot sufficiently for to positively throw and hold the pawl in and out of the ratchet, and to keep it away from the ratchet during the back motion, and in lock or gear therewith during the forward motion, without the aid of a spring.

Figure 1:
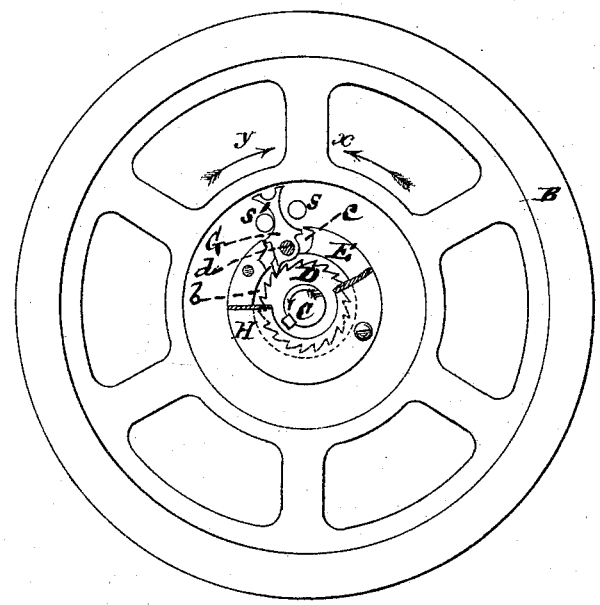
Figure 2:
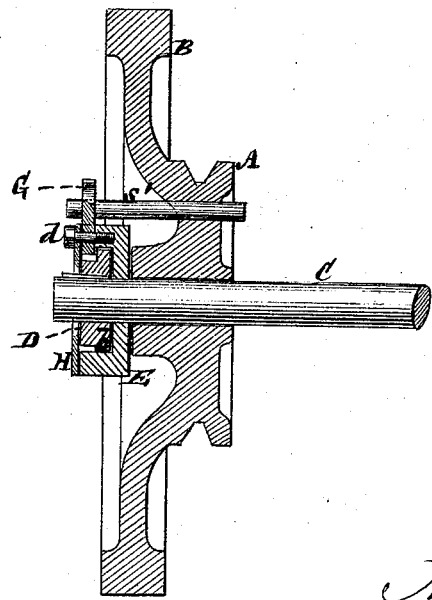

Figure 1 represents a partly-broken face view of my improved mechanical movement applied to a concentric shaft designed to travel in one direction only, and operated by a band-pulley which is free to move in reverse directions. Fig. 2 is a transverse section of the same, taken in direction of the length of the shaft.

A is the band wheel or pulley, to which may be attached a fly-wheel, B, and which is free to turn in reverse directions on or around a concentrically-arranged shaft, C, preferably at or near one end of the latter. D is a ratchet-wheel fast on the shaft C, and having an attached disk, $b$, on its back, of a slightly-greater diameter than said wheel. This disk $b$ fits, in common with the ratchet, snugly over the shaft C, and the two are secured to said shaft by key or otherwise. E is a box, fitted to turn loosely on the shaft C in rear of the disk $b$, and of sufficient depth or capacity to receive freely within it the ratchet-wheel D and its attached disk $b$, which latter serves as a bearing for the box. Said box should be of a sufficiently large interior diameter where it incloses the ratchet to allow for wear of the bearing.

A recess, $c$, is formed in one portion of the rim or side of the box E, to receive the pawl G, and to provide room for the rocking or working of the latter therein. This pawl works on a pivot, $d$, arranged within the recessed portion of the box, and is a lever of the first order, its inner end or arm serving to engage and disengage with the ratchet-wheel D, and its outer end or arm made to extend through and outside of the recess $c$ in the box, and forming the portion to which the driving force is applied. Said pawl may be balanced on its pivot, so that the slightest application of force will serve to throw it in or out of the ratchet-wheel.

H is a cover or plate, which may or may not be used on the outer end of the box or pawl-carrier E, but which, if used, serves to assist in holding the pawl in place to exclude dust from the ratchet, and to conceal and protect the working parts.

Projecting outwardly from the face of the band wheel or pulley A, against or in close relation with the hub of which the box E is arranged, are pins $s$ $s'$, on opposite sides of the outer end or arm of the pawl G, with sufficient play or lost space between said pins for the pawl G to engage and disengage itself with the ratchet-wheel D.

In the operation of the device, when the band wheel or pulley A is moving in a forward direction, as indicated by the arrow $x$, the pin or projection $s$ strikes and acts on the outer end of the pawl G, to project and hold it within the ratchet-wheel D, and to rotate in the same direction the shaft C, to which the ratchet is attached. When, however, the band wheel or pulley A is moving in a backward direction, as indicated by the arrow $y$, then the pin or projection $s'$ strikes and acts on the end of the pawl G to lift and hold it out of contact with the ratchet-wheel D, and so leave the shaft C at rest while the band wheel or pulley and pawl turn around it.

I claim—

The combination, with the pawl G, pivoted to the loosely-revolving box or carrier E, of the driving pulley or device A, provided with pins or projections $s\ s'$, arranged on opposite sides of one end of the pawl, and having lost space or motion between them, the ratchet-wheel D, and the shaft C, substantially as specified.

ARTHUR E. BLAKE.

Witnesses:
JAMES F. BLAKE,
HERMAN M. WEBSTER.